United States Patent
Wäller et al.

(10) Patent No.: US 8,907,778 B2
(45) Date of Patent: Dec. 9, 2014

(54) MULTI-FUNCTION DISPLAY AND OPERATING SYSTEM AND METHOD FOR CONTROLLING SUCH A SYSTEM HAVING OPTIMIZED GRAPHICAL OPERATING DISPLAY

(75) Inventors: Christoph Wäller, Braunschweig (DE); Michael Mischke, Hannover (DE)

(73) Assignee: Volkswagen AG, Wolfsburg (DE)

( * ) Notice: Subject to any disclaimer, the term of this patent is extended or adjusted under 35 U.S.C. 154(b) by 272 days.

(21) Appl. No.: 13/124,038

(22) PCT Filed: Oct. 14, 2009

(86) PCT No.: PCT/EP2009/007375
§ 371 (c)(1),
(2), (4) Date: Jun. 1, 2011

(87) PCT Pub. No.: WO2010/043388
PCT Pub. Date: Apr. 22, 2010

(65) Prior Publication Data
US 2011/0227718 A1   Sep. 22, 2011

(30) Foreign Application Priority Data

Oct. 15, 2008   (DE) .................... 10 2008 052 797
Oct. 2, 2009    (DE) .................... 10 2009 048 043

(51) Int. Cl.
| | |
|---|---|
| *B60Q 1/00* | (2006.01) |
| *G06F 3/0488* | (2013.01) |
| *G06F 3/0481* | (2013.01) |
| *G06F 3/0489* | (2013.01) |

(52) U.S. Cl.
CPC .......... *G06F 3/04886* (2013.01); *G06F 3/0481* (2013.01); *G06F 3/0489* (2013.01)
USPC .......................................................... 340/461

(58) Field of Classification Search
USPC ............................................. 701/1; 340/461
See application file for complete search history.

(56) References Cited

U.S. PATENT DOCUMENTS 8,305,192 B2 * 11/2012 Connolly et al. ............. 340/10.1
8,344,847 B2 *  1/2013 Moberg et al. ................ 340/3.2
(Continued)

FOREIGN PATENT DOCUMENTS

| DE | 19921285 A1 * | 8/2000 | ............... H01H 9/18 |
| DE | 103 26 215 A1 | 12/2004 | |

(Continued)

OTHER PUBLICATIONS

Translation of DE 10 2006 028 046 A1.*
(Continued)

*Primary Examiner* — Hai Phan
*Assistant Examiner* — Zhen Y Wu
(74) *Attorney, Agent, or Firm* — Barnes & Thornburg LLP

(57) ABSTRACT

A multi-function display and operating system are provided in a motor vehicle and a method for operating such a system is provided. The multi-function display and operating system includes at least one display device for displaying information, a control unit controlling the representation of information on a display surface of the display device, at least two operating units for capturing user inputs, wherein the control unit is designed to control the representation of the information displayed to support the user inputs on the display surface of the display device by different operating displays which are each adapted to one of the at least two operating units via which a user input is captured or for which an operating intention for a user input is captured.

31 Claims, 7 Drawing Sheets

(56) References Cited

U.S. PATENT DOCUMENTS

| | | | |
|---|---|---|---|
| 2007/0052545 A1 | 3/2007 | Le Gallic | |
| 2007/0168089 A1* | 7/2007 | Goldbeck et al. | 701/1 |
| 2007/0198141 A1* | 8/2007 | Moore | 701/3 |
| 2008/0252439 A1* | 10/2008 | Yamamoto et al. | 340/461 |
| 2009/0127328 A1* | 5/2009 | Aissa | 235/377 |

FOREIGN PATENT DOCUMENTS

| | | | | |
|---|---|---|---|---|
| DE | 103 42 666 | | 4/2005 | |
| DE | 10340249 | A1 | 4/2005 | |
| DE | 102005011094 | A1 | 11/2005 | |
| DE | 102005035111 | A1 | 9/2006 | |
| DE | 10 2005 060 605 | A1 | 6/2007 | |
| DE | 10 2006 037 156 | A1 | 9/2007 | |
| DE | 10 2006 028 046 | A1 | 12/2007 | |
| DE | 102006028046 | A1 * | 12/2007 | B60K 35/00 |
| DE | 102006028463 | A1 * | 12/2007 | G06F 3/048 |
| DE | 10 2006 034 415 | A1 | 1/2008 | |
| DE | 10 2006 037 762 | A1 | 2/2008 | |
| DE | 10 2007 029 618 | A1 | 6/2008 | |
| DE | 102007018072 | A1 | 10/2008 | |
| DE | 102007042676 | A1 | 3/2009 | |
| EP | 1518742 | A2 | 3/2005 | |

OTHER PUBLICATIONS

PCT International Search Report and Written Opinion for PCT/EP2009/007375 completed by the EP Searching Authority on Feb. 15, 2010.

English translation of ISR for PCT/EP2009/007375 completed by the EP Searching Authority on Feb. 15, 2010.

* cited by examiner

MULTI-FUNCTION DISPLAY AND OPERATING SYSTEM AND METHOD FOR CONTROLLING SUCH A SYSTEM HAVING OPTIMIZED GRAPHICAL OPERATING DISPLAY

CROSS-REFERENCE TO RELATED APPLICATIONS

This application is a U.S. national counterpart application of international application Serial No. PCT/EP2009/007375 filed Sep. 9, 2009. PCT/EP2009/007375 claims the benefit of German Patent Application No. 102008052797.1 filed Oct. 15, 2008 and German Patent Application No. 102009048043.9 filed Oct. 2, 2009.

The invention relates to a multifunction display and operator control system according to the preamble of patent claim 1 and to a method having the features according to the preamble of patent claim 12.

In modern motor vehicles, increasing use is being made of multifunction display and operator control systems which comprise at least one display apparatus for displaying information and also a control unit which controls presentation of information on a display panel of the display apparatus. The control unit has at least one operator control device coupled to it for the purpose of capturing user inputs. Said operator control device can be used to capture operating actions by a user. Such a system allows a multiplicity of different vehicle functions to be controlled and operated.

DE 103 42 666 DE discloses an operator control system for a vehicle which comprises a visual display unit for presenting at least one function and at least one operating means which is associated with the visual display unit for the purpose of operator control of the at least one presented function. The operator control system comprises a further operating means and a sensor which detects when the further operating means is approached, the recognized approach being followed by presentation of a function associated with the further operating means on the visual display unit.

DE 103 26 215 A1 discloses an operator control apparatus for appliances and/or vehicles with specific operator control devices which comprise a screen, arranged in the visual range of the operator, with a screen display. The operator control devices have an associated sensor system for contactlessly capturing the presence and/or movement of the operator in a vicinity of the respective operator control device. The screen display presents a function using the function which can be operated using the operator control device when the operator is in the vicinity of the relevant operator control device.

DE 10 2005 060 605 A1 discloses an operator control device for a vehicle having touch-sensitive panels, wherein the panels have a multiplicity of different operator control panels which each have at least one associated control function, wherein different operator control panels are separated from one another by a grating, wherein the touch-sensitive panel is in the form of a touch-sensitive display and wherein the information presented on an operator control panel is dependent on the operating state of the vehicle. Such an operator control device can be used in various vehicles and, in this case, can be used for operator control of various vehicle systems in a form matched to the respective operating state, i.e. the respective equipment of the vehicle.

DE 10 2006 028 046 A1 discloses a combined display and operator control apparatus for a motor vehicle which comprises a touch-sensitive screen for the display and selection of operator control functions, wherein a device for capturing an operating element, particularly a hand or a finger, is provided, wherein the screen can be changed over from an information mode to an operating mode, in which it is possible to preselect operator control functions, when an operating element is captured in a predetermined area around the screen.

DE 10 2006 034 415 A1 discloses a method and an arrangement for the operator control of electrical appliances. At least one operator control device allows the selection of at least one further menu level in a menu level and the display of said further menu level on a display. When an object approaches the operator control device equipped with a proximity sensor or when the operator control device equipped with a contact sensor is touched by an object, a further menu level selected by the operator control device is displayed in the display as part of a preview. When the object, for example a person's finger, is removed, the further menu level disappears again and the originally presented menu level is automatically displayed again. This avoids multiple operation of the operator control devices, which increases operator control convenience for electrical appliances.

DE 10 2006 037 762 A1 discloses a multifunction operator control apparatus in a motor vehicle. Said apparatus comprises a display apparatus having a display screen and at least one touch-sensitive sensor unit. The display apparatus is used to reproduce information data, particularly image or video data, at least following activation of a function, wherein the information data are reproduced in a full-screen mode at least essentially without presentation of operator control devices on the display screen, and the at least one position-sensitive sensor unit is used to capture a first operator control action which comprises a user's body part approaching the display screen and/or the display screen being touched by a body part at a respective position at which information data are reproduced, with operator control and/or information elements being opened on the display screen as a result of the captured first operator control action.

DE 10 2006 037 156 A1 discloses an interactive operator control apparatus having a display apparatus and a method for operating the interactive operator control apparatus. The known method comprises the following steps: graphical information is displayed on the display apparatus; sensor information is received; an operator control action is activated when the sensor information is used to ascertain that a user's body part is located within an activation area which is spatially defined relative to a presentation area of an operator control device on the display apparatus with which the operator control action is associated; wherein the received sensor information comprises user information which has its timing evaluated prior to activation of the operator control action in order to ascertain an operator control intention for the at least one operator control device; and the information presented on the display apparatus is adapted on the basis of the ascertained operator control intention, so that the at least one operator control device is presented in a form optimized for activating the operator control action associated with the operator control device.

DE 10 2007 029 618 A1 discloses a contactlessly activatable display and operator control apparatus. The display and operator control apparatus can be operated in a first mode and at least in one second activated mode. Changeover from the first mode to the second activated mode is dependent on the operating element approaching the display apparatus, which is preferably in the form of a touch screen. In the second mode, altered reproduction of information takes place, which allows the operator control of vehicle functions and systems which can be controlled by means of the display and operator control apparatus. The description also states that the display and operator control apparatus may comprise further operator control devices or may be coupled to such operator control devices, which can likewise be used to control some of the functions which can be controlled using the display and operator control apparatus.

As revealed by the cited documents from the prior art, there is a need to design multifunction display and operator control apparatuses in motor vehicles such that the vehicle systems and/or functions which are controlled using the multifunction display and operator control apparatus can be controlled in as intuitive and simple a manner as possible. This is particularly necessary in order to allow the most error-free and rapid operator control possible, particularly including by the driver while driving the motor vehicle.

The invention is therefore based on the technical problem of developing multifunction display and operator control apparatuses and also methods for operating such a multifunction display and operator control apparatus further such that simple control of such systems is possible which covers at least two operator control devices for capturing user inputs.

In this case, the invention is based on the idea of respectively designing a presentation of information on a display panel of the display apparatus such that the information assisting operator control is presented in what is known as an operator control presentation in each case in a form matched to the respective operator control device for which an operator control intention has been captured. A multifunction display and operator control apparatus according to the invention is therefore designed such that it can ascertain an operator control intention for at least two different operator control devices before the operator control device is operated, said operator control device being designed for user input.

In particular, a multifunction display and operator control system in a motor vehicle is proposed which comprises at least one display apparatus for displaying information, a control unit which controls the presentation of the information on a display panel of the display apparatus, and at least two operator control devices for capturing user inputs, wherein the control unit is designed to control the presentation of the information which is displayed on the display panel of the display apparatus for the purpose of assisting the user inputs using various operator control presentations which are each in the form matched to that of the at least two operator control devices which is used to capture a user input or for which an operator control intention for a user input has been captured. The information is therefore controlled in the manner optimized for capturing a user input using the one operator control device in an operator control presentation customized for this one operator control device.

A method for controlling a multifunction display and operator control system therefore comprises the following steps: the display apparatus is actuated such that information for assisting the user inputs is displayed on the display panel, wherein the presentation of the information on the display panel of the display apparatus is controlled such that the information displayed on the display panel of the display apparatus for the purpose of assisting the user inputs is presented by means of various operator control presentations which are accordingly each designed to match that of the at least two operator control devices which is used to capture a user input or for which an operator control intention for a user input has been captured. An operator control presentation for the displayed information is therefore displayed, said operator control presentation being customized for capturing the user input using the at least one operator control device.

This solution is based on the insight that different operator control devices require different graphical presentations of information in order to assist the user in a user input or to be able to capture a user input in optimum fashion, i.e. without erroneous operator control and with the lowest possible operating complexity, for example.

One advantage of the provision of different operator control devices which can be used alternatively for a user input and are therefore available redundantly is the fact that the different operator control devices afford different advantages which are preferred by a user when used in a vehicle in different driving or use situations, for example. Use of a rotary control or rotary push control usually results in fewer erroneous inputs while traveling in a vehicle. In addition, operator control actions by vehicle drivers while driving the vehicle produce smaller observable lane deviations than when a touch screen or a touchpad is used, for example. By contrast, a touch screen is perceived by users to be more intuitive for the operating process.

The user can therefore select the respective suitable operator control device on the basis of the situation and receives on the display panel an operator control presentation which is designed to match the respective chosen operator control device.

In one preferred embodiment, an appropriate one of the various operator control presentations respectively has the presented information in optimized form for capture of the user input by means of that of the at least two operator control devices which is used to capture a user input or for which a user intention for a user input has been captured. The operator control presentation is therefore designed such that the presented information assists a user in the user input in as intuitive a manner as possible. By way of example, the information is presented such that the operating action to be performed for the user input can be carried out as easily and as ergonomically matched to the respective operating device used as possible. A method of appropriate design therefore provides for the information in the operator control presentations to be respectively presented in a manner optimally customized for user input using that of the at least two operator control devices which is used to capture a user input or for which an operator control intention for a user input has been captured.

An operator control intention is usually captured using one or more sensor units. In one embodiment of the invention, the control unit therefore has at least one sensor unit coupled to it for the purpose of capturing an operator control intention from a user for one of the at least two operator control devices before the one of the at least two operator control devices is operated for the purpose of user input. In a method of corresponding design, sensor data from at least one sensor unit is captured and evaluated in order to capture the operator control intention of a user for one of the at least two operator control devices before said operator control device is operated for the purpose of user input.

In one development, the at least one sensor unit and/or at least one further sensor unit are designed to additionally capture an operator control intention for at least one further one of the at least two operator control devices before said further operator control device is operated for the purpose of user input. In the case of such a multifunction display and operator control system, the at least one sensor unit and/or at least one further sensor unit are designed to additionally capture an operator control intention for at least one further one of the at least two operator control devices before said further operator control device is operated for the purpose of user input, and the control unit is designed to control the presentation of the information in at least one further operator control presentation customized for capturing the user inputs using the at least one further operator control device. In one embodiment, the data captured from the at least one sensor unit and/or at least one further sensor unit are evaluated in order to additionally ascertain an operator control intention for at least one further operator control device prior to operation for the purpose of user input, and the presentation of the information on the display panel of the display apparatus is controlled such that when an operator control intention is ascertained for the at least one further operator control device, the information is presented in a manner optimally customized for capturing the user input using the at least one further operator control device in at least one further operator control presentation. Such an embodiment therefore has provision for the data captured from the at least one sensor unit and/or at least one further sensor unit to be evaluated in order to additionally ascertain an operator control intention for at least one further operator control device before operation for the purpose of user input.

If the one operator control device is in the form of a touch-sensitive position-finding unit, for example, then the position found for an operating element, for example a user's finger, may have a directly associated function and/or operator control option. If at least one of the at least two operator control devices is therefore in the form of a touch-sensitive position-finding unit, this can be used to capture one of the user inputs by ascertaining a position at which the at least one of the at least two operator control devices is touched by an operating element. If the touch-sensitive position-finding unit is of integral design with the display apparatus as a touch screen, for example, then it is a simple matter for a function or operator control option to be intuitively associated, by means of graphical presentation of a virtual operator control device on the display panel, with an area above that or with a contact position immediately in the presentation area of the virtual operator control device.

If, by contrast, one of the at least two operator control devices is in the form of a rotary push control then it is advantageous to assign to a functions and/or operator control options presented on the display panel a cursor which brings about graphical highlighting of one of the functions and/or operator control options. In one embodiment, provision is made for the at least one further one of the at least two operator control devices to capture rotary or push operation of an operating element. In one preferred embodiment, rotation of the rotary push control can be used to prompt cyclic "migration" of the cursor via the individual functions and/or operator control options. When a function and/or operator control option which a user wishes to perform is marked by the cursor, the function and/or operator control option is selected preferably by means of push operation of the rotary push control. With particular preference, the individual functions and/or operator control options are presented in the operator control presentation associated with the rotary push control in circular form, so that a geometry of the operator control device corresponds to a geometry of the operator control presentation.

While use of a rotary push control requires the presentation of a cursor, this is not necessary in the case of a touch-sensitive position-finding sensor as operator control device, for example, provided that said position-finding sensor is of integral design with the display panel as a touch screen. If, by contrast, a touch-sensitive position-finding sensor is used as operator control device and is of separate design from the display panel as a touch pad, it may likewise make sense to present a cursor in point form or in the style of crosshairs which can be moved on the display panel relative to the presented functions and/or operator control options by virtue of the touch pad being operated by being touched by an operating element of the user, particularly a finger. In some embodiments, provision is made for a touch on a touchpad to prompt the cursor to be assigned to an operator control device and then to be moved or positioned in another way by means of sliding, stroking or similar movements of the operating element and assigned to a desired operator control device. Subsequently, it is then possible for the operator control device with which the cursor is associated in this manner to be selected. To this end, it is possible, by way of example, for a double touch on the touch pad within a prescribed period to be envisaged and performed.

In the case of an operator control device which is in the form of a touch pad, for example, and in which a touch-sensitive position-finding unit with an areal extent is designed and arranged separately and not in front of the display panel of the display apparatus, one preferred embodiment involves positions on the operator control device in the form of a touch-sensitive position-finding unit being associated with positions on the display panel. This provides a user with the capability of simple orientation. If appropriate, a user interface in such a case can even dispense with the use of a cursor or of a focus identified by graphical highlighting.

If, by way of example, an operator control device which is in the form of a key pad having a plurality of keys arranged in the manner of a matrix, for example, is in turn used then it is possible for an association between the functions and/or operator control options and the individual keys on the key pad to be visually displayed and clarified for a user by virtue of graphical reproduction of the key pad on the display panel. In one embodiment, push or touch operation of an operator control key on a key pad is therefore detected.

In one preferred embodiment of the invention, provision is made for the at least one operator control device to have the at least one sensor unit associated with it and for the at least one further operator control device to have the at least one further sensor unit associated with it, in each case for the purpose of capturing the operator control intention. This means that in one preferred embodiment, each of the operator control devices has at least one associated sensor which is provided for the purpose of capturing an operator control intention. Suitable sensors for capturing an operator control intention are particularly sensors which evaluate capacitive coupling of the user's operating element to the respective operator control device or to a portion of the operator control device. Other advantageous sensors can actively emit electromagnetic radiation, for example in the infrared wavelength range, and detect reflection and/or scatter of the emitted electromagnetic radiation. Even sensors operating on the basis of other principles, particularly optical sensors, can be used for approach recognition. In principle, it is possible to use all sensor units and sensor systems which can detect an approach by the operating element to one of the operator control devices. In the case of operator control devices which are not automatically operated on contact, as is the case with a rotary push control, for example, the sensor units may also be in the form of touch-sensitive sensors which capture an operator control intention.

Individual operator control devices may also have a plurality of associated sensor units which preferably capture different operating states. By way of example, both a sensor unit for contactless approach detection and a sensor unit for detecting when the operator control device is touched may be provided.

In one embodiment, provision is made for the sensor unit to be integrated in the at least one operator control device and/or for the further sensor unit to be integrated in the at least one further operator control device. Frequently, it is possible to evaluate capacitive coupling of an operating element on a signal line which is also used to transmit the signals for the user input which are captured upon operation. Integration of the sensor units into the operator control devices also saves on installation space.

In one preferred embodiment, there is an animated change between one operator control presentation and the other operator control presentation. This means that a user has an operator control presentation transformed by means of at least one intermediate presentation which equates neither to one nor to the other operator control presentation. Elements which are no longer required can be hidden, for example, virtual operator control devices can have their size and/or arrangement translated, a cursor can be shown or hidden, etc.

Preferably, the multifunction display and operator control system comprises operator control devices of different type. This means that different operating actions are captured and/or evaluated when the user input is captured. Whereas a rotary press control involves a rotation or depression being captured, for example, a touch-sensitive position-finding unit involves contact and/or a sliding touch movement over a sensor area, for example a display panel of a touch screen or the area of a touch pad, being captured. Similarly, some embodiments allow evaluation of how many fingers are used for touching, the speed at which a sliding movement is made, etc.

Preferably, virtual operator control devices and/or operator control device associations in the at least two operator control presentations are presented in a manner customized to a geometric design of the operator control device which is used to capture a user input or for which an operator control intention for a user input has been captured.

In one embodiment, the display panel is used to display the operator control presentation which is customized for that of the at least two operator control devices for which an operator control intention has recently been ascertained. This means that the operator control presentation does not alter when the operator control element is removed from the operator control device again following operation or following termination of operation.

In another embodiment, provision is made for the information to be displayed in a target operator control presentation or in an information conveyance presentation if no operator control intention has been recognized. In some embodiments, there is a change into the target operator control presentation or the information conveyance presentation after a prescribed period of time has elapsed, after which operation or an operator control intention is no longer captured.

If the user changes the operator control device used for user input, the operator control presentation changes accordingly. If the display apparatus is in the form of a dual or multiple view display which can be operated such that different information can be seen when the display apparatus is viewed from different viewing angles, one embodiment has provision for operation by just one user for all viewing angles to involve display of the operator control presentation which corresponds to the operator control device which is currently being used to capture a user input or for which an operator control intention has been or is being captured. If the approach of an operating element belonging to a further user to another operator control device, or operation of the other operator control device by the further user, is captured then one embodiment involves another operator control presentation being additionally displayed, in the manner customized to the other operator control device, that is to say with information to support the user input using the other operator control device, such that said other operator control presentation can be seen from the viewing angle in which the further user views the display apparatus.

The invention is explained in more detail below using a preferred exemplary embodiment with reference to a drawing, in which.

Figure 3A:
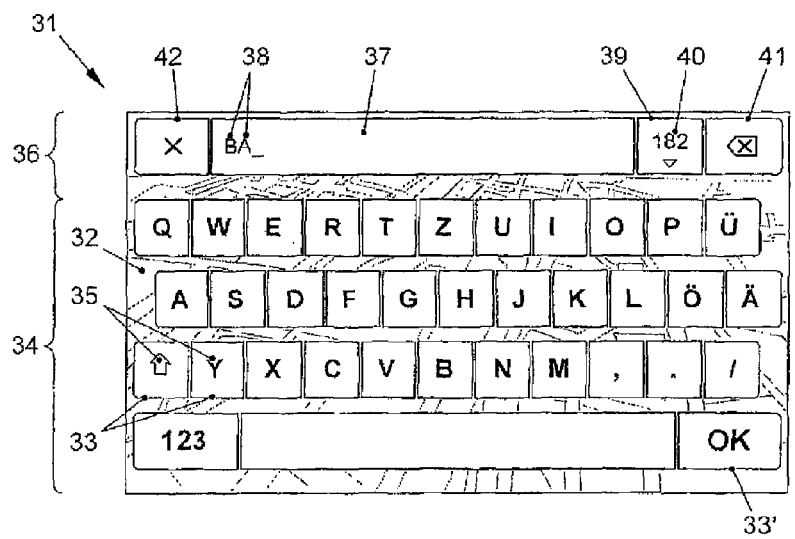
FIG. 3a shows a schematic operator control presentation which is displayed in order to assist location input for satellite-assisted vehicle navigation on a display panel when the display apparatus is in the form of a touch screen and the touch screen is used as an operator control device for user input.
Figure 3B:
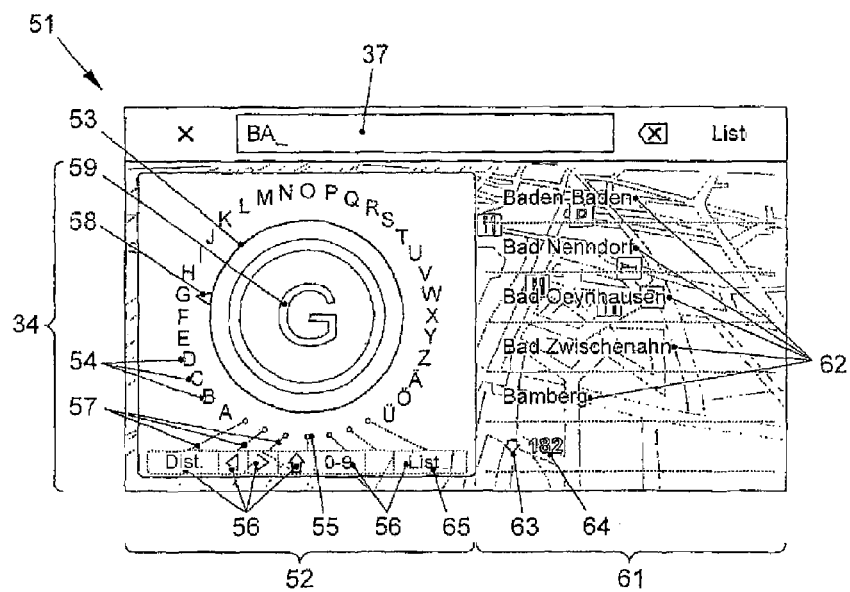
Figure 3C:
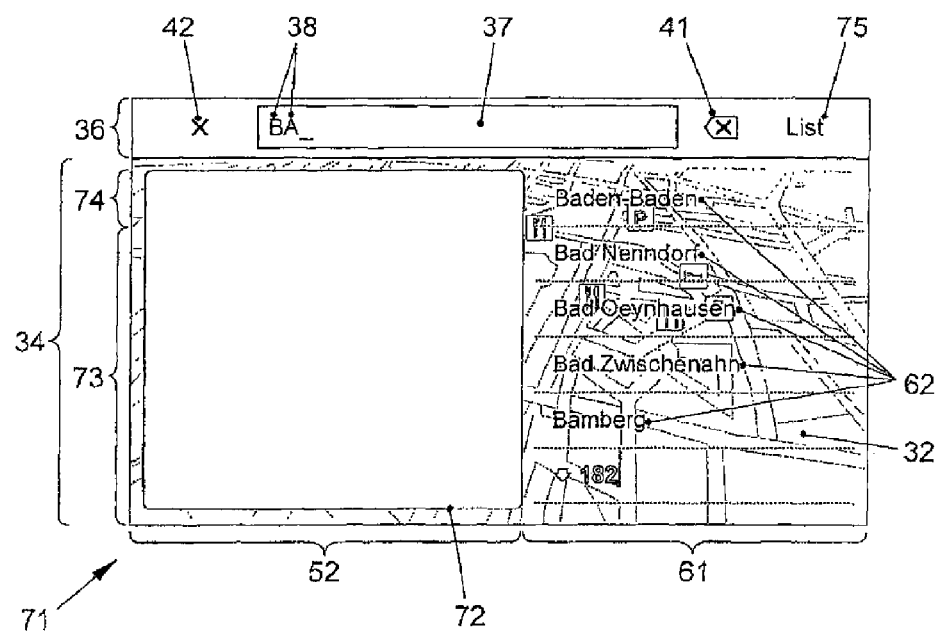
Figure 4A:
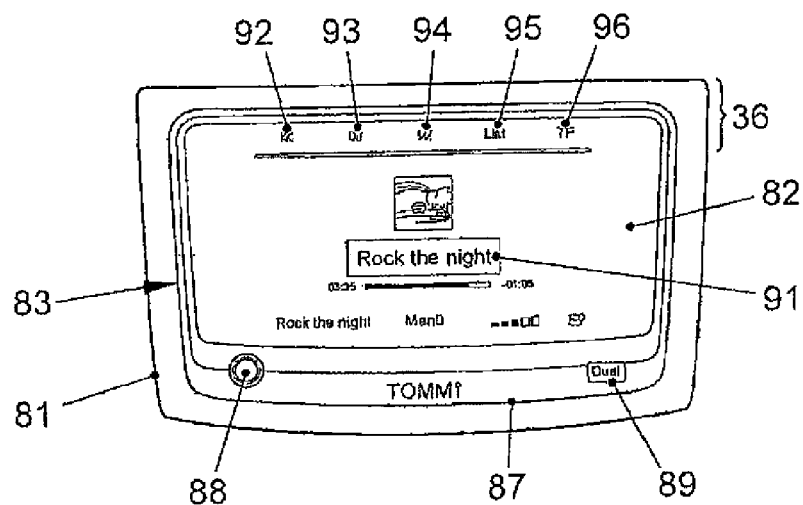
Figure 4B:
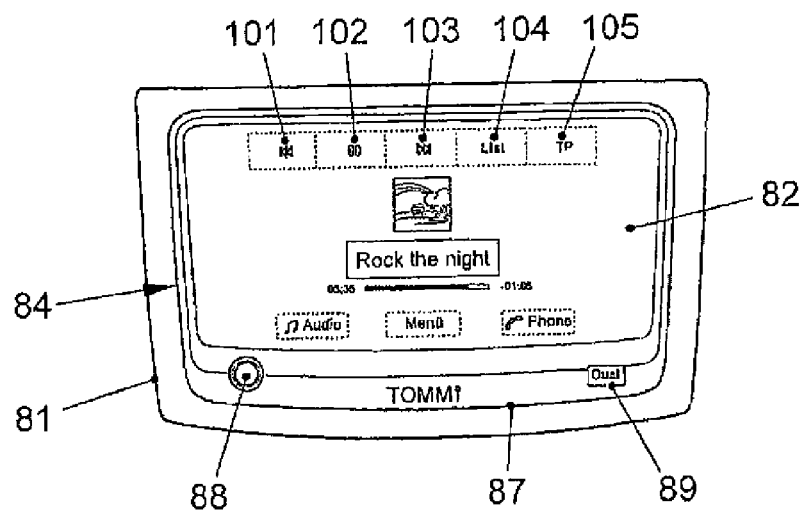
Figure 4C:
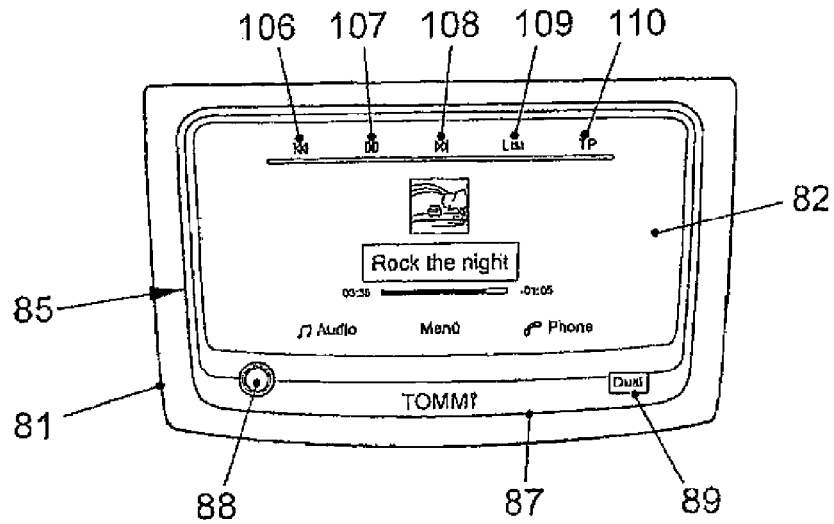
Figure 4D:
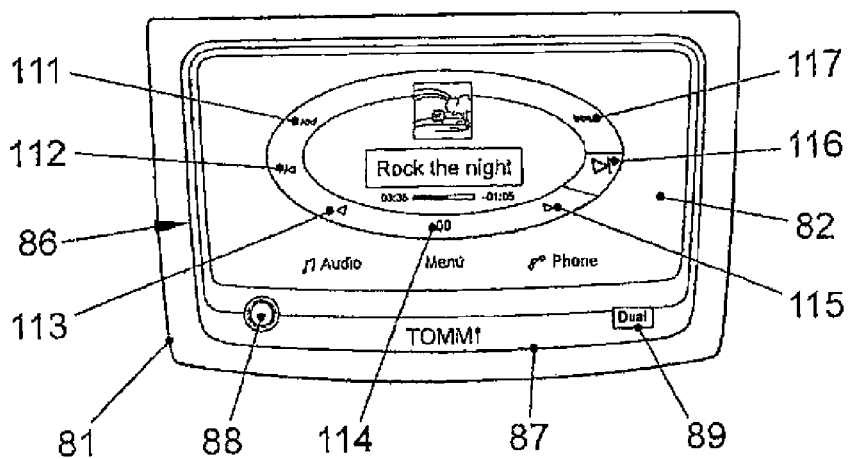
Figure 5:
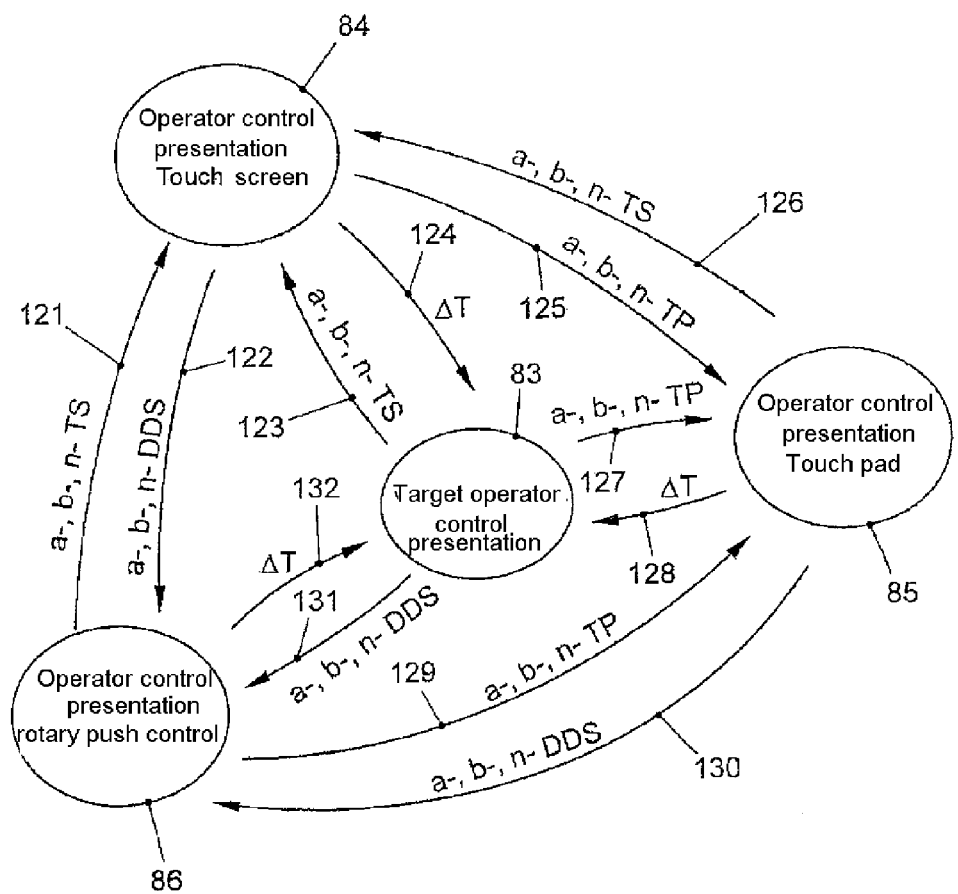

FIG. 3b shows a schematic operator control presentation which is displayed to assist location input for satellite-assisted vehicle navigation on a display panel when a rotary push control is used as operator control device for user input; and FIG. 3c shows a schematic operator control presentation which is displayed to assist location input for satellite-assisted vehicle navigation on a display panel when a touch pad is used as operator control device for user input;

FIG. 4a shows a schematic view of a display apparatus in a multifunction display and operator control system with a target operator control presentation or an information conveyance presentation for a media player function;

FIG. 4b shows a schematic view of the display apparatus in the multifunction display and operator control system shown in FIG. 4a, wherein the operator control presentation is shown customized for user input using a touch screen provided in the display apparatus;

FIG. 4c shows a schematic view of the display apparatus in the multifunction display and operator control system shown in FIG. 4a, wherein the operator control presentation is shown customized for user input using a touch pad;

FIG. 4d shows a schematic view of the display apparatus in the multifunction display and operator control system shown in FIG. 4a, wherein the operator control presentation is shown customized for user input using a rotary push control; and FIG. 5 shows a schematic illustration of the user interface logic unit which defines the display of the operator control presentations.

Figure 1:
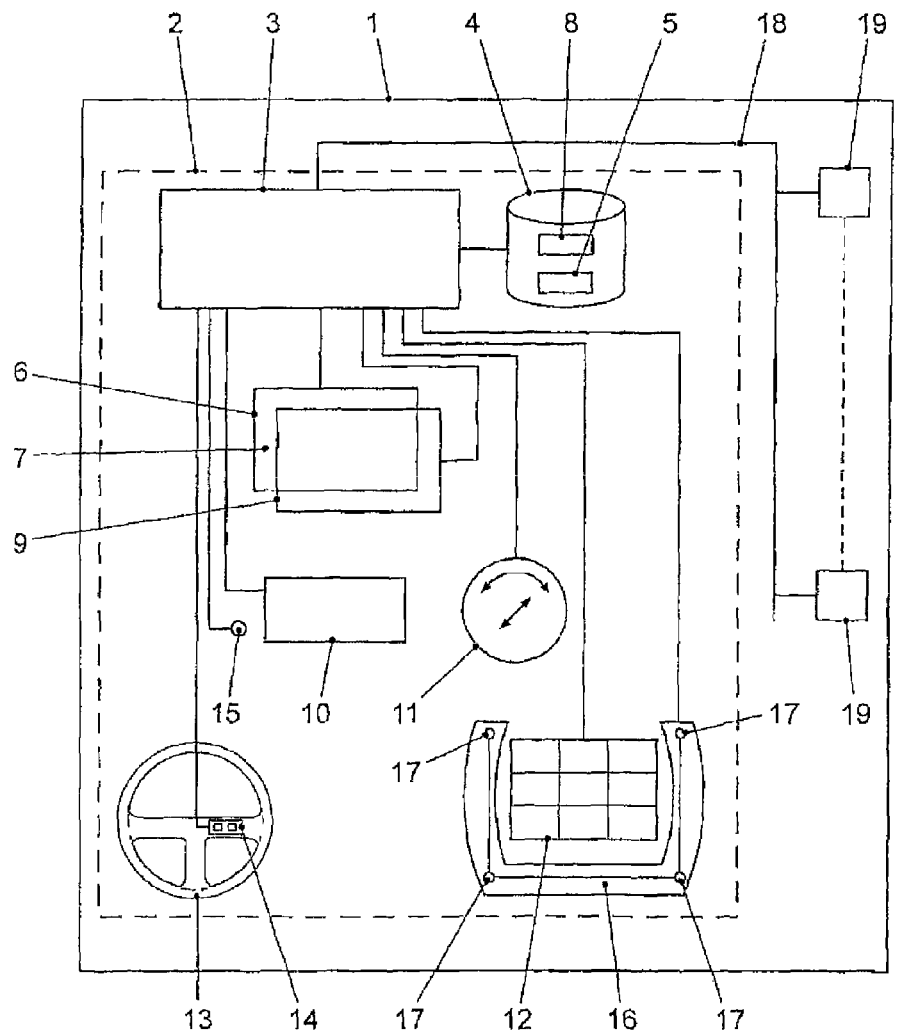
FIG. 1 shows a schematic illustration of a motor vehicle with a multifunction display and operator control system.

FIG. 1 schematically shows a motor vehicle 1. The motor vehicle 1 comprises a multifunction display and operator control system 2. The multifunction display and operator control system 2 comprises a control unit 3 which is coupled to a memory 4. Preferably, the control unit 3 is designed as a microprocessor or comprises a microprocessor. The memory 4 is integrated in the control unit 3 in some embodiments. The memory unit 4 preferably stores a program code 5 which can be executed on the microprocessor (not shown) of the control unit 4 and provides a functionality for the multifunction display and operator control system 2. The control unit 3 is coupled to a display apparatus 6 which has a display panel 7. The control unit 3 controls presentation of information on the display panel 7. Information required for this purpose is preferably likewise stored in the memory 4 as graphics information 8, for example.

The display apparatus 6 is produced together with a touch-sensitive position-finding unit 9 as a touch screen. The touch-sensitive position-finding unit 9 is an operator control device which can be used to capture user inputs. Further operator control devices which are present with the control unit 3 are a touch pad 10, a rotary push control 11, a key pad 12 and a multifunctional switch 14 integrated in a steering wheel 13. The touch pad 10 has an associated proximity sensor 15 of separate design. The multifunction key pad 14 has an associated contactless position-finding unit 16 which can capture a position for an operating element, for example a finger, contactlessly in three dimensions in space in front of and next to the key pad 12. The touch-sensitive position-finding unit 9, the rotary push control 11 and the multifunction switch 14 are designed such that they can capacitively capture an approach by an operating element, for example a user's finger, as an operator control intention.

By way of example, the contactlessly measuring position-finding unit 16 is designed such that it comprises a plurality of sensors 17 which ascertain a distance between the operating element and the relevant sensor 17. To this end, the individual sensors 17 can emit electromagnetic radiation in the infrared wavelength range, for example, and can detect reflection of this radiation by means of a photodiode, for example. Skilled arrangement of the individual sensors 17 of the contactlessly measuring position-finding unit 16 allows triangulation to be used to ascertain the position of the operating element in three dimensions in space and, by this means, allows detection of an approach by the operating element to the key pad 12.

The control unit 3 is designed to present information which assists capture of a user input in an operator control presentation in a respectively customized manner such that said operator control presentation allows optimum user capture by one of the operator control devices to which a user approach, i.e. by which an operator control intention, has been recognized. If the user moves an operating element, for example his finger (not shown), toward the display panel or the touch-sensitive position-finding unit 9, for example, then virtual operator control devices for the individual controllable functions and/or operator control options are presented on the display panel 7, said devices being presented in optimum fashion in terms of size and arrangement, i.e. so as not to overlap, for example, in an arrangement for touch operation. If, by contrast, an operator control intention for the rotary push control 11 is recognized, then the functions and/or operator control options are arranged along a circle, which is usually not shown, and a function and/or an operator control option is assigned a cursor which, by way of example, is presented as a frame in highlighted color around the relevant function and/or operator control option. A change from one operator control presentation to another operator control presentation, which is made when an operator control intention for another operator control device is captured, is preferably made in animated fashion. This means that the user can see a kind of film sequence on the display panel when a new operator control intention is recognized.

Once the user input has been captured, the control unit 3 produces a control signal or a control command which is transmitted via a vehicle data bus 18 to one of the vehicle systems 19 which can be operated and controlled by means of the multifunction and operator control system 2.

In one embodiment, provision is made for a display panel to be used to display a target operator control presentation which is designed in optimized fashion for user capture of one of the operator control devices which is most frequently used by the user, for example.

In one embodiment, provision is made for the target operator control presentation to be defined on the basis of evaluation of the operating actions performed by the user. This involves selection of the operator control presentation which is associated with the operator control device which is used most frequently by the user in order to perform a user input.

In another embodiment, provision may be made for the display panel to be used to display an information conveyance presentation which is optimized for conveying information and not for operator control when no operator control intention for one of the plurality of operator control devices has been captured.

Figure 2A:
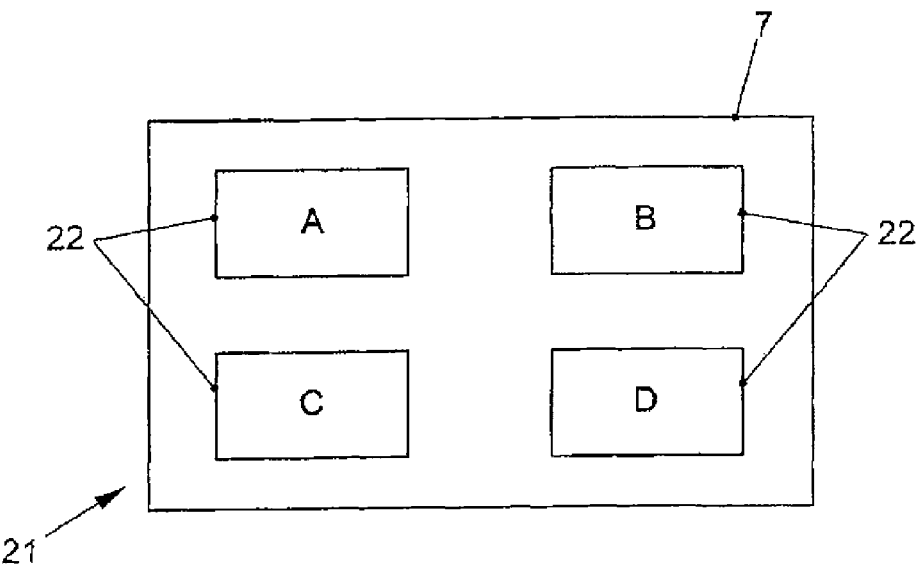
FIG. 2a shows a schematic illustration of an operator control presentation, customized for control of an operator control device which is in the form of a touch-sensitive position-finding unit and is designed with a display apparatus as a touch screen.

FIG. 2a shows an example of a view of a display panel 7 which shows an operator control presentation 21 presenting the individual functions and/or operator control options A-D for operator control by a touch-sensitive position-finding unit which is designed to be integral with the display panel as a touch screen. The individual functions and/or operator control options A-D are presented as virtual operator control devices 22 which are shown in an even distribution, in each case in the same size, over the display panel 7.

Figure 2B:
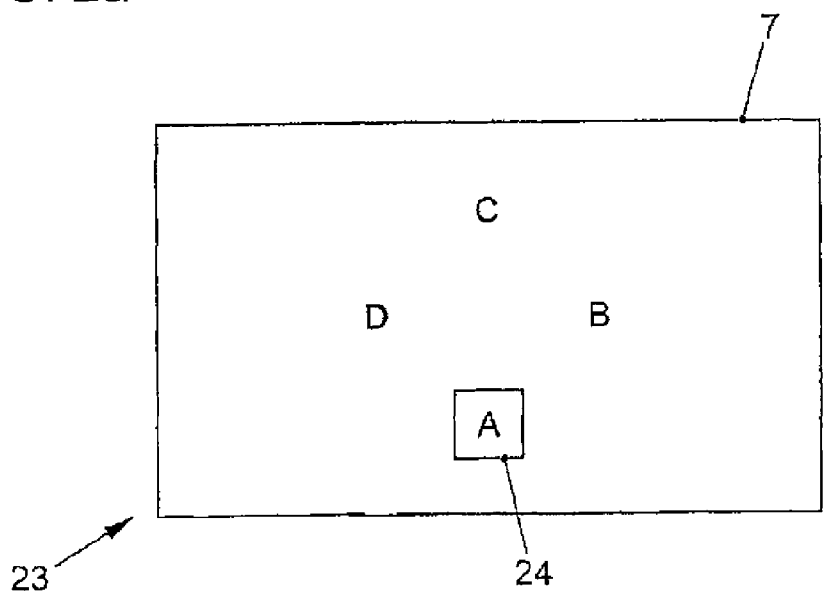
FIG. 2b shows a schematic illustration of another operator control presentation similar to that shown in FIG. 2a but which is customized for control by a rotary push control.

FIG. 2b schematically shows another operator control presentation 23 in which the same functions and/or operator control options A-D as in the case of the operator control presentation 21 in FIG. 2a are shown. However, the other operator control presentation 23 is customized for operating by a rotary push control. The individual functions and/or operator control options A-D are arranged along a circle (not shown). A function A has a frame-like cursor 24 shown around it which marks that function A which can be preselected by means of push operation of the rotary push control. By rotating the rotary push control, it is possible to associate the cursor 24 with the other functions and/or operator control options B-D arranged along the circle.

FIGS. 3a to 3c schematically show different operator control presentations for a multifunction display and operator control system.

FIG. 3a shows a schematic operator control presentation 31 which is displayed on a display panel, for example to assist location input for satellite-assisted navigation, when the display apparatus is in the form of a touch screen and the touch screen is used as an operator control device for capturing the user input. Above a navigation map 32 shown in the background are shown keys 33 from a virtual key pad in a main section 34. The individual keys 33 have associated characters or functions, as are known to a user from a computer keyboard or typewriter. The symbol or the associated function associated with the respective key are in each case represented by means of a graphical presentation 35.

By touching the virtual keys 33, it is therefore possible to input or capture a name of a destination letter by letter. An upper region 36 of the operator control presentation 31 contains an input panel 37 in which the letters 38 which have already been input appear. To the right of the input panel 37 there is shown a virtual drop-down list button 39, the numerical label 40 of which indicates how many destinations the navigation system knows which start with the letters 38 already input. In the exemplary embodiment shown, the navigation system knows 182 destinations which start with the letters "BA". If the drop-down list button 39 is touched by the user, the display apparatus is used to display a list which indicates the destinations which start with the letters 38 which have already been specified.

The upper region 36 also contains a virtual erase key 41 which can be used to erase previously input letters 38 step by step. In addition, the upper region 36 contains a virtual back key 42 in order to terminate presentation of the operator control presentation 31, so that the navigation map 32 is displayed preferably over the full area. The virtual keys 33 shown comprise an "OK" key 33' in order to select a destination which is shown completely in the input panel 37 as a destination for satellite-assisted navigation. It is self-evident to a person skilled in the art that the input of a navigation destination is merely an exemplary user input. Any other information can be input or captured in this way.

FIG. 3b schematically shows a further operator control presentation 51 of the multifunction display and operator control system, said presentation being displayed on the display panel when the user uses a rotary push control for the user input instead of the touch screen. A left-hand portion 52 of the main section 34 of the operator control presentation 51 graphically shows the current position of the rotary push control 53. Shown around the rotary push control 53 are the individual letters 54 of the alphabet in a circle. Additionally, individual positions 55 in the circle have associated functions which are represented by means of function presentations 56 which are connected by means of lines 57 to the positions 55 with which they are associated. An arrow 58 indicates which letter 54 or which position 55 and, above that, function or function presentation 56 is currently selected. The selected letter 54 or the selected function presentation 56 is displayed in an enlarged form in a center 59 of the rotary push control 53 presented in the circle. By rotating the rotary push control 53, it is possible to preselect the arrow 58 and hence the letter 54 or the relevant function represented for the function presentation 56 and to select it by depressing the rotary push control. The right-hand portion 61 of the main portion 34 contains a list of individual destinations 62 which start with the letters which are indicated in the input panel 37 and have already been input or captured. An arrow 63 with a numerical statement 64 arranged next to it indicates that there are a further 182 destinations which start with the letter combinations "BA". If the position 55 which corresponds to the "list" function presentation 65 is selected by the user then a cursor (not shown here) appears in the list of destinations 62, said cursor graphically highlighting one of the destinations and being able to be moved in the list of destinations by rotating the rotary push control in order to preselect one of the destinations and to select it by subsequently depressing the control.

FIG. 3c shows a further operator control presentation 71 which is displayed on the display panel of the multifunction display and operator control system when the user uses for input a touch pad, i.e. a touch-sensitive position-finding unit, which is not arranged in front of the display panel of the display apparatus. The left-hand portion of the main section 34 of the operator control presentation 71 schematically shows a touch pad 72. This touch pad presentation is broken down again into a touch pad main section 73 and an upper region 74 of the touch pad 72. There is a 1:1 association between the positions on the normal touch pad and the presentation positions of the touch pad 72 shown. In the region of the touch pad which corresponds to the touch pad main section 73, the user uses his finger, for example, to write individual letters. The capture apparatus captures the individual touch positions and ascertains therefrom the input letter, which is then subsequently displayed in the input panel 37. In some embodiments, the trail of the touch positions is graphically presented in the touch pad main section 73, so that the user can visually inspect the input character himself. This is useful particularly when letters need to be input which have strokes comprising multiple subsections which start at different touchdown points. An example which may be mentioned in this context is the upper-case letter A, for which a user first of all traces an acute angle contour and then traces a crossbar in the angle.

The right-hand region 61 again shows a list of the known destinations 62 which start with the already input letters "BA" and are known to the navigation system.

The elements shown in the upper region 36 of the operator control presentation 71, the virtual back key 42, the input panel 37, the virtual erase key 41 and a virtual list preselection key 75 each have corresponding associated sections of the upper region of the touch pad and the presentation of the touch pad 72 in line with the graphical representation in the upper region 36. This allows the user to preselect or select an appropriate virtual key 42, 41, or 75 or an element which is presented in the upper region 36 of the operator control presentation 71 by touching the relevant position in the upper region of the touch pad. If the user touches the upper region of the touch pad on the far right, for example, the virtual list selection key 75 is operated. This achieves changeover to a list selection mode in which one of the destinations 62 is assigned a cursor which is shown by graphical highlighting, for example. Touch movement up and down in the region of the real touch pad which corresponds to the touch screen main section 73 can be used by the user to move the cursor in the list of known destinations 62 and thus to select one of the known destinations accordingly. Subsequently touching the touch pad by tapping on it can then be used to select the destination which is currently highlighted by the cursor, for example.

It is self-evident to a person skilled in the art that the user interface described for the input of a destination is merely exemplary in nature in this case.

FIGS. 4a to 4d each show a display and operator control device 81. Said device comprises a display apparatus. The display panel 82 of said display apparatus is accordingly used to show a target operator control presentation 83 and various operator control presentations 84-86 for controlling a multimedia system in FIGS. 4a to 4d. Arranged in front of the display panel 82 is a touch-sensitive position-finding unit of transparent design (not visible). Together with the display apparatus, this forms an operator control device in the form of a touch screen.

A frame 87 contains operator control devices designed in hardware, for example a rotary control 88 and a pushbutton switch 89.

In FIG. 4a, the display panel 82 of the display apparatus shows the target operator control presentation 83, which is shown when an operator control intention for one of the available operator control devices has not yet been ascertained. In the embodiment shown, the target operator control presentation 83 depicts information 91 about a title which is being rendered, the playback time thereof and a view of a cover of the associated data storage medium. An upper region 36 of the display panel indicates possible operator control options by means of graphical symbols 92-96 which are presented in semi-transparent form, which is indicated by means of dashed lines. In the embodiment shown, the multifunction display and operator control system comprises the touch screen, a touch pad and a rotary push control, which is usually different than the rotary control 88, as operator control device. When an operator control intention for a user input using the touch screen, i.e. the touch-sensitive position-finding unit coupled to the display apparatus, is captured, the operator control presentation 84 is displayed, said presentation being shown in FIG. 4b. Besides information 91, various virtual operator control elements 101-105 are shown which correspond to the operator control options shown in FIG. 4a.

FIG. 4c shows an operator control presentation 85 which is displayed when the user performs a user input using the touch pad or an operator control intention for the touch pad has been captured. The operator control functions shown by means of nontransparent graphical symbols 106-110 again have associated regions of the touch pad. When a user touches the touch pad at the relevant position or on the relevant region, the relevant symbol is graphically highlighted, for example. Subsequent tap operation at the same position or in the same region then allows selection of the function which is associated with the relevant graphically highlighted symbol.

FIG. 4*d* shows an operator control presentation 86 which is displayed when the user makes the user input using the rotary push control. The symbol 116—which again has an associated function—selected by virtue of the current position of the rotary push control is graphically highlighted. By depressing the rotary push control, the relevant function can be selected. The individual symbols 111-117 associated with the functions are presented in this operator control presentation on a circle or circle segment which is virtually tilted in space.

FIG. 5 schematically shows a graphical representation of the operator control logic of a user interface which, by way of example, corresponds to an embodiment which is described in connection with FIGS. 4*a* to 4*d*. The relevant multifunction display and operator control system has three operator control devices, a touch screen (abbreviated by the letters "TS"), a touch pad (abbreviated by the letters "TP") and a rotary push control (abbreviated by the letters "DDS"). In this case, the individual operator control devices are respectively in a form such that they can capture—preferably separately—an approach (abbreviated by the letter "a"), a touch (abbreviated by the letter "b") and the operator control per se, i.e. a user input (abbreviated by the letter "n"). To this end, the operator control devices may also have a plurality of sensors. When an approach, a touch or a user input, i.e. operator control, is captured for one of the operator control devices, the operator control presentation (84-86) associated with the operator control device is respectively displayed on the display panel.

Whereas the actions linked to operation are associated with lower-case letters, the operator control devices are associated with a letter combination comprising upper-case letters. Labels associated by means of arrows 121-132 can be used to derive the operator control logic of the user interface. A "lower-case letter/LETTER COMBINATION" notation communicates that the action associated with "lower-case letters" is performed using or is related to the operator control device associated with the "LETTER COMBINATION". By way of example, the notation "a-TP" indicates that an approach to the touch pad has been recognized.

The label "ΔT" represents the lapsing of a prescribed period of time in which no action (approach, touch, operator control (user input)) has been recognized or captured. "ΔT" therefore symbolizes what is known as the timeout, a "time changeover". The prescribed period of time may be 10 s, for example. It can thus be seen that, when the prescribed period of time has elapsed, an operator control presentation (84-86) which is associated with one of the operator control devices is changed to the target operator control presentation 83 if approach, touch or operator control is not captured for any of the operator control devices. Furthermore, it can be seen that a change between the operator control presentations (84-86) associated with the various operator control devices is made directly when the user changes the operator control device used during the user input. In this case, an operator control intention is captured by means of an approach, for example.

It is self-evident to a person skilled in the art that merely exemplary embodiments are shown schematically in this case.

The invention claimed is:

1. A multifunction display and operator control system for use in a motor vehicle, the system comprising:

at least two operator control devices for capturing user input;

a display that outputs information to a user to facilitate user input via one of the at least two operator control devices using one of a plurality of operator control presentations output on the display;

a control unit coupled to the display and which controls a format of the information output on the display; and wherein the at least two operator control devices are different operator control devices which can be used alternatively to capture the same user input in different ways, wherein the control unit controls the format of the output information on the display to facilitate user input using one of the plurality of operator control presentations, wherein the user input is captured via one of the at least two operator control devices and is facilitated using one of the plurality of operator control presentations, wherein the format of each of the plurality of operator control presentations output on the display is matched to a corresponding one of the at least two operator control devices used to capture the user input or for which an operator control intention for user input has been captured, wherein the system further comprises one or more sensor units coupled to the control unit and capturing an operator control intention from the user for one of the at least two operator control devices before the one of the at least two operator control devices is operated by the user for the purpose of user input, and wherein each of the at least two operator control devices are different types of operator control devices and the operator control presentation output on the display is matched to the type of operator control device approached by the user or used by the user to enter user input to facilitate that user input using that operator control device.

2. The system of claim 1, wherein an appropriate one of the operator control presentations includes information presented in optimized form to capture the user input via one of the at least two operator control devices which is used to capture the user input or for which an operator control intention for the user input has been captured.

3. The system of claim 2, wherein the control unit communicates with at least one sensor unit coupled to the control unit and capturing the operator control intention from the user for one of the at least two operator control devices before the one of the at least two operator control devices is used to capture user input.

4. The system of claim 3, wherein the at least one sensor unit is one of a plurality of sensor units that capture an operator control intention for at least one of the plurality of operator control devices before any one of the operator control devices is operated to capture user input.

5. The system of claim 3, wherein the at least one operator control device is associated with a plurality of sensor units including the at least one sensor unit capturing the operator control intention.

6. The system of claim 5, wherein at least one sensor unit of the plurality of sensor units is integrated in the at least one operator control device.

7. The system of claim 5, wherein the at least two operator control devices are implemented as the plurality of sensor units.

8. The system of claim 1, wherein at least one of the at least two operator control devices is a touch-sensitive position-finding unit.

9. The system of claim 8, wherein positions on the touch-sensitive position-finding unit are associated with positions on the display panel.

10. The system of claim 1, wherein at least one of the at least two operator control devices is a rotary push control or keypad.

11. The system of claim 1, wherein the plurality of operator control presentations include at least one of virtual operator control devices and operator control device associations that are matched to a geometric design of the one of the at least two operator control devices which is used to capture a user input or for which an operator control intention for a user input has been captured.

12. The system of claim 1, wherein the at least two operator control devices each are provided to alternatively capture the same information input by the user.

13. The system of claim 1, wherein the control unit and the display are both separate from the at least two operator control devices.

14. A method for controlling a multifunction display and operator control system in a motor vehicle, the method comprising:
    actuating a display to output information to a user to facilitate user input via one of the at least two operator control devices using one of a plurality of operator control presentations output on the display,
    controlling a format of the information on the display using a control unit coupled to the display such that one of the plurality of operator control presentations is selected to output information displayed on the display to assist the user input using one of the at least two operator control devices,
    capturing an operator control intention from the user for one of the at least two operator control devices using one or more sensor units coupled to the control unit before the one of the at least two operator control devices is operated by the user for the purpose of user input,
    wherein the at least two operator control devices are different operator control devices which can be used alternatively to capture the same user input in different ways,
    wherein the format of each of the plurality of operator control presentations output on the display is matched to a corresponding one of the at least two operator control devices used to capture user input or for which an operator control intention for user input has been captured, and
    wherein each of the at least two operator control devices are different types of operator control devices and the operator control presentation output on the display is matched to the type of operator control device approached by the user or used by the user to enter user input to facilitate that user input using that operator control device.

15. The method of claim 14, wherein each of the plurality of operator control presentations is in a form matched to a user input using one of the at least two operator control devices to capture a user input or for which an operator control intention for a user input has been captured.

16. The method of claim 14, further comprising capturing and evaluating sensor data from at least one sensor unit to capture the operator control user intention for one of the at least two operator control devices before the operator control device is actuated.

17. The method of claim 16, wherein the at least one sensor unit is included in a plurality of sensor units and the method further comprises evaluating the data captured by the plurality of sensor units to determine the operator control intention for at least one of the operator control devices prior to operation of that operator control device for capturing user input.

18. The method of claim 16, wherein the capturing of the operator control intention for the at least one operator control device is performed using the at least one sensor unit and the operator control intention for the at least one further operator control device is captured at least one further sensor unit.

19. The method of claim 14, wherein the at least two operator control devices are used to at least one of capture or evaluate various operation actions during capture of the user input.

20. The method of claim 14, wherein at least one of the at least two operator control devices is a touch-sensitive position-finding unit that captures user input by ascertaining a position at which at least one of the at least two operator control devices is touched by an operating element.

21. The method of claim 14, wherein at least one of the at least two operator control devices captures rotary or push operation of an operating element or push or touch operation of an operator control key on a keypad.

22. The method of claim 14, wherein at least one of virtual operator control devices and operator control device associations included in the plurality of operator control presentations are presented in a form matched to a geometric design of the operator control device which is used to capture a user input or for which an operator control intention for a user input has been captured.

23. The method of claim 14, further comprising displaying information in a target operator control presentation or information conveyance presentation on the at least one display if no operator control intention has been recognized and no user input is captured.

24. The method of claim 14, wherein the at least two operator control devices each are provided to alternatively capture the same information input by the user.

25. The method of claim 14, wherein the control unit and the display are both separate from the at least two operator control devices.

26. A multifunction display and operator control system in a motor vehicle, the system comprising:
    at least two operator control devices that capture user input;
    a display that outputs information to a user to facilitate user input via one of the at least two operator control devices using one of a plurality of operator control presentations output on the display; and
    a control unit coupled to the display and that controls a format of the information output on the display;
    wherein the at least two operator control devices are different operator control devices which can be used alternatively to capture the same user input in different ways, and the control unit controls the format of the information output on the display, wherein the format is determined based on selection of one of the plurality of operator control presentations which are each matched to one of the at least two operator control devices used to capture user input or for which an operator control intention for a user input has been captured, wherein the user input is captured via one of the at least two operator control devices,
    wherein the system further comprises one or more sensor units coupled to the control unit and capturing an operator control intention from the user for one of the at least two operator control devices before the one of the at least two operator control devices is operated by the user for the purpose of user input, and
    wherein each of the at least two operator control devices are different types of operator control devices and the operator control presentation output on the display is matched to the type of operator control device approached by the user or used by the user to enter user input to facilitate that user input using that operator control device.

27. The system of claim 26, wherein the at least two operator control devices each are provided to alternatively capture the same information input by the user.

28. The system of claim 26, wherein the control unit and the display are both separate from the at least two operator control devices.

29. A method for controlling a multifunction display and operator control system in a motor vehicle, the method comprising:

actuating a display to output information, wherein the output information facilitates user input via one of at least two operator control devices that are separate from the display, wherein the output information includes one of a plurality of operator control presentations used to facilitate user input via one of the at least two operator control devices;

controlling, using a control unit, a format of the output information on the display such that one of the plurality of operator control presentations matched to a corresponding one of the at least two operator control devices is output on the display, capturing an operator control intention from the user for one of the at least two operator control devices using one or more sensor units coupled to the control unit before the one of the at least two operator control devices is operated by the user for the purpose of user input, wherein a format of each of the plurality of operator control presentation matches the one of the at least two operator control devices which is used to capture user input or for which an operator control intention for a user input has been captured, wherein the at least two operator control devices are different operator control devices which can be used alternatively to capture the same user input in different ways, and wherein each of the at least two operator control devices are different types of operator control devices and the operator control presentation output on the display is matched to the type of operator control device approached by the user or used by the user to enter user input to facilitate that user input using that operator control device.

30. The method of claim 29, wherein the at least two operator control devices each are provided to alternatively capture the same information input by the user.

31. The method of claim 29, wherein the control unit and the display are both separate from the at least two operator control devices.

* * * * *

UNITED STATES PATENT AND TRADEMARK OFFICE
CERTIFICATE OF CORRECTION

Page 1 of 1

PATENT NO. : 8,907,778 B2
APPLICATION NO. : 13/124038
DATED : December 9, 2014
INVENTOR(S) : Christoph Wäller and Michael Mischke It is certified that error appears in the above-identified patent and that said Letters Patent is hereby corrected as shown below:

In the Specification

Column 1, lines 10-15 replace the paragraph following the heading, CROSS-REFERENCE TO RELATED APPLICATIONS, with the following corrected paragraph:

This application is a U.S. national counterpart application of international application Serial No. PCT/EP2009/007375 filed Oct. 14, 2009. PCT/EP2009/007375 claims the benefit of German Patent Application No. 102008052797.1 filed Oct. 15, 2008 and German Patent Application No. 102009048043.9 filed Oct. 2, 2009.

Signed and Sealed this
Sixteenth Day of June, 2015

Michelle K. Lee
*Director of the United States Patent and Trademark Office*